(12) United States Patent
Simon et al.

(10) Patent No.: US 9,176,676 B2
(45) Date of Patent: Nov. 3, 2015

(54) EFFICIENCY OF VIRTUAL MACHINES THAT USE DE-DUPLICATION AS PRIMARY DATA STORAGE

(71) Applicants: Gerald Simon, Mountain View, CA (US); Greg Wade, San Jose, CA (US); Barry Herman, Atherton, CA (US)

(72) Inventors: Gerald Simon, Mountain View, CA (US); Greg Wade, San Jose, CA (US); Barry Herman, Atherton, CA (US)

( * ) Notice: Subject to any disclaimer, the term of this patent is extended or adjusted under 35 U.S.C. 154(b) by 280 days.

(21) Appl. No.: 13/953,782

(22) Filed: Jul. 30, 2013

(65) Prior Publication Data

US 2015/0039846 A1  Feb. 5, 2015

(51) Int. Cl.
*G06F 12/00* (2006.01)
*G06F 3/06* (2006.01)
*G06F 9/455* (2006.01)
*G06F 11/14* (2006.01)

(52) U.S. Cl.
CPC ............ *G06F 3/0641* (2013.01); *G06F 3/0619* (2013.01); *G06F 3/0673* (2013.01); *G06F 9/455* (2013.01); *G06F 11/1453* (2013.01)

(58) Field of Classification Search
CPC ....... G06F 3/06; G06F 3/0641; G06F 3/0662; G06F 3/0664; G06F 3/0665; G06F 3/0667; G06F 9/455; G06F 9/45533; G06F 9/45558; G06F 2009/45562; G06F 2009/45575; G06F 2009/45583; G06F 11/1446; G06F 11/1448; G06F 11/1453
See application file for complete search history.

(56) References Cited

U.S. PATENT DOCUMENTS

2010/0257523 A1\* 10/2010 Frank ................................ 718/1

\* cited by examiner

*Primary Examiner* — Shawn X Gu

(57) ABSTRACT

Example apparatus and methods provide two types of storage for a virtual machine running on a hypervisor. The first storage is de-duplication based and the second storage is not de-duplication based. Example apparatus and methods may acquire data from the first storage to instantiate the virtual machine, to instantiate an operating system on the virtual machine, or to instantiate an application on the virtual machine from the first storage. Example apparatus and methods may write a snapshot to the second storage and then support random input/output for the virtual machine, for the operating system, or for the application from the second storage. The snapshot may selectively be collapsed or the second storage may selectively be retired and thus example systems may selectively update the first storage from the second storage. Having dual devices facilitates using de-duplication storage for de-duplication-centric I/O while non-de-duplication storage is used for random I/O.

16 Claims, 8 Drawing Sheets

EFFICIENCY OF VIRTUAL MACHINES THAT USE DE-DUPLICATION AS PRIMARY DATA STORAGE

BACKGROUND

FIG. 1 illustrates a hypervisor 100 running a virtual machine 102. In computer science, a hypervisor is a piece of computer software, firmware, or hardware that creates and runs virtual machines. A hypervisor may also be called a virtual machine monitor (VMM). A computer on which a hypervisor is running a virtual machine may be referred to as a "host machine." The virtual machine running on the hypervisor may be referred to as a "guest machine." A hypervisor provides a virtual operating platform for a guest operating system. The hypervisor also manages execution of the guest operating system. Multiple instances of guest operating systems may share virtualized hardware resources. A virtual machine (VM) is a software implemented abstraction of a set of underlying computer hardware. VMs are based on the specifications of a hypothetical computer and may, therefore, emulate the computer architecture of a tangible computer, including the functions of the tangible computer.

FIG. 1 illustrates primary data store 112 as a virtualized hardware resource. De-duplication storage 120 may be the actual hardware resource that supports the virtualized hardware resource. Systems administrators may choose to configure de-duplication storage 120 as the primary data store 112 for the virtual machine 102 for a variety of reasons. For example, virtual machines running the same guest operating system may share gigabytes of common data that is efficiently stored in a de-duplicated manner on de-duplication storage 120 and data read in when an operating system is booting may be the same for guest operating systems running on a number of virtual machines. These repetitive reads may be handled efficiently by de-duplication storage 120.

Backing up copies of virtual machines to the de-duplication storage 120 may also be very efficient since many blocks that are common to the guest operating systems will not need to actually be written to the de-duplication storage 120 since those duplicate blocks will already be on the de-duplication storage 120. Using de-duplication storage 120 as the primary data store 112 may also provide efficiencies associated with de-duplication replication for offsite disaster recovery. Instead of having to replicate common blocks that are shared by the multiple instances of the guest operating systems on the virtual machines, a single copy of the de-duplicated blocks may be replicated.

However, using de-duplication storage 120 as the primary data store 112 for virtual machine 102 may create some undesirable issues. FIG. 2 illustrates a virtual machine (VM) 102 running an operating system 103 that in turn is running an application 104 and an application 105. Initially, when the operating system 103 boots, or when an application starts up, long sequential reads of de-duplicated blocks may occur efficiently from the base disk file 230. However, after boot time, as non-boot processing occurs in the operating system 103 or applications 104 and 105, more random I/O may occur. Using a de-duplication storage apparatus to satisfy this random I/O load may provide a sub-optimal experience. By way of illustration, a guest operating system (e.g., operating system 103) may perform numerous, frequent non-sequential writes. Many of these writes may be quickly over-written. Additionally, the most recently written data may also be read frequently. The most recently written and read data may be small and unique to a specific VM. This I/O load may be ill-suited to a de-duplication apparatus.

While handling this ill-suited load may be annoying for a single VM and a single guest operating system, when a hypervisor runs multiple (e.g., hundreds) of guest operating systems, the random I/O load may begin to degrade I/O performance to an unacceptable level when a de-duplication appliance is used for the primary data store. A conventional system may attempt to mitigate this issue by providing large read caches to prevent unwanted accesses to the de-duplication data store. However, providing large read caches and other conventional approaches to mitigating performance degradation when using a de-duplication apparatus for primary VM storage may still not provide adequate performance.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods use virtual machine snapshots to improve the input/output (I/O) characteristics of a virtual machine (VM) that is configured to use a de-duplication apparatus as its primary data store. Example apparatus and methods facilitate using a de-duplication storage device as the primary storage for a VM without having the VM experience significant degradation of I/O performance when random I/O is experienced.

Figure 1:
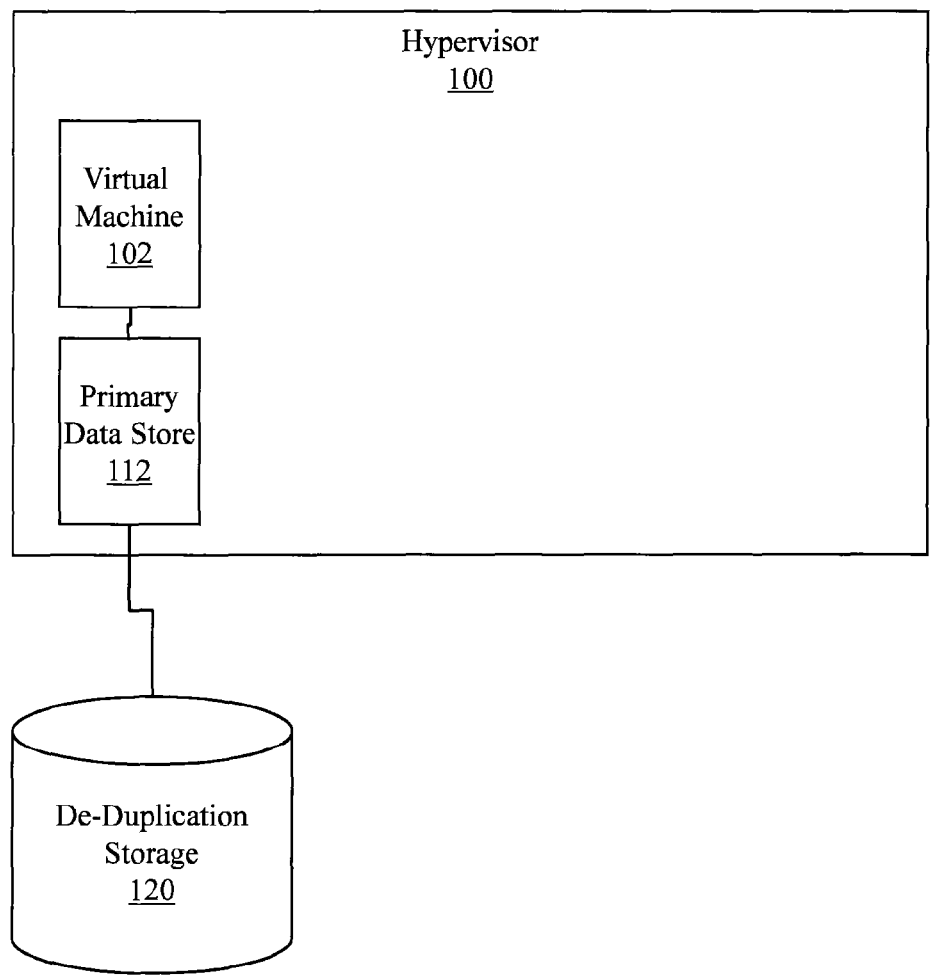
FIG. 1 illustrates an example configuration having a hypervisor, a virtual machine (VM), and a primary data store.
Figure 2:
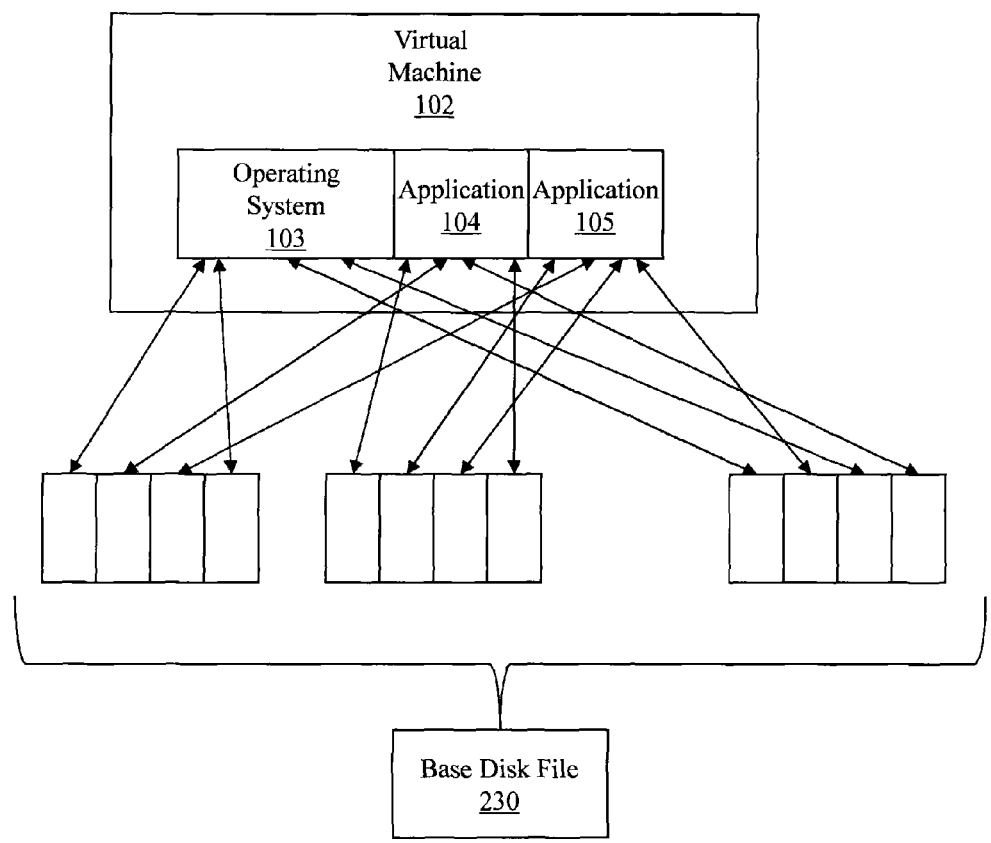
FIG. 2 illustrates an example I/O load associated with an example configuration having a hypervisor, a virtual machine (VM), and a primary data store.
Figure 3:
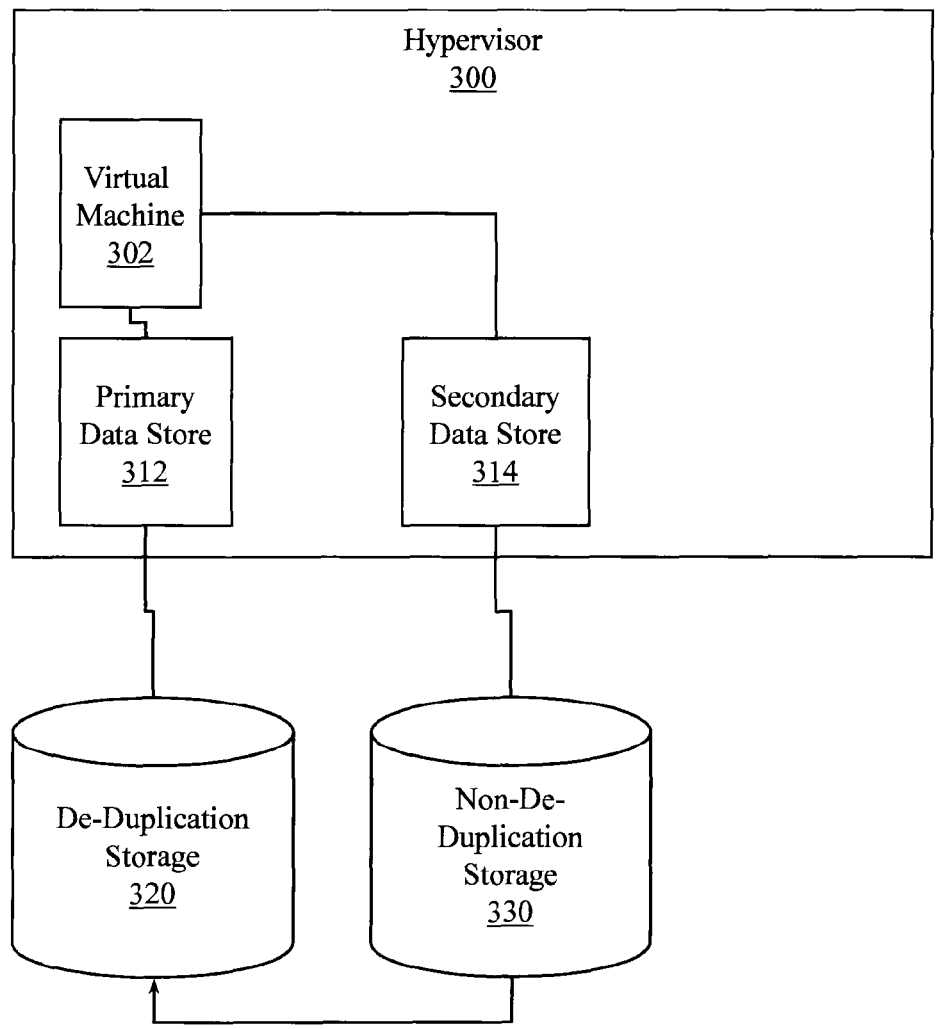
FIG. 3 illustrates an example configuration having a hypervisor, a virtual machine (VM), a primary data store, and a secondary data store.

FIG. 3 illustrates a hypervisor 300 that is running a virtual machine 302. VM 302 is interacting with a primary data store 312 and a secondary data store 314. Primary data store 312 is supported by a de-duplication storage 320 and secondary data store 314 is supported by a non-de-duplication storage 330. While a single non-de-duplication storage 330 is illustrated, secondary data store 314 may be configured to interact with a plurality of non-de-duplication storages (see, e.g., FIG. 5).

Hypervisor 300 may be configured to allow or cause virtual machine 302 to write a snapshot to secondary data store 314. In one embodiment, hypervisor 300 may be configured to allow or cause VM 302 to write a snapshot to secondary data store 314 by treating secondary data store 314 as an alternate primary storage device. Access to the alternate primary storage device may be achieved by, for example, changing a "working directory" with which the VM 302 is interacting. A VM snapshot may be, for example, a file-based view of the state, disk data, memory, configuration, and other information associated with a VM at a specific point in time. It is possible to take multiple snapshots of a VM. A snapshot may be acquired even while a VM is running. A snapshot may be treated as a whole or may have its contents accessed individually. A snapshot may preserve the state and data of a VM at a specific point in time. The state may include, for example, the VM's power state (on, off, suspended). The data may include, for example, all the files touched by the VM and all the files that make up the VM. The data may also include, for example, information from disks, memory, and other devices touched by the VM.

Example apparatus and methods involve writing a snapshot of VM 302 to non-de-duplication storage 330 via the secondary data store 314. Writing the snapshot to the non-de-duplication storage 330, and then selectively satisfying certain I/O from the VM 302 from the non-de-duplication storage 330 or from the snapshot, while selectively satisfying other I/O from the de-duplication storage 320, facilitates changing and improving the I/O pattern of the VM 302. In one embodiment, non-de-duplication storage 330 may be smaller, faster, or more suited to random I/O than de-duplication storage 320. For example, de-duplication storage 320 may be a tape drive, a large disk, a redundant array of independent disks (RAID), a solid state drive (SSD), a memory or other device while non-de-duplication storage 330 may be a disk drive, (SSD), or even memory based device. Though the types of devices used for de-duplication storage 320 and non-de-duplication storage 330 may vary, example apparatus and methods are configured to have devices that are more suited to random I/O and non-de-duplicated data and devices that are more suited to sequential I/O and de-duplicated data. The device more suited to random I/O may be used to store the snapshot and satisfy the post boot I/O load while the device more suited to sequential I/O may be used to store de-duplicated blocks and to satisfy the boot I/O load. The snapshot can be used to satisfy the small reads and writes that are frequently repeated or over-written while the de-duplication storage 320 can be used to satisfy the large sequential reads associated with booting VM 302 or operating systems or applications launched by VM 302.

A snapshot may have a finite size. Additionally, an instance of a VM may come and go, an instance of an operating system may come and go, an instance of an application may come and go, and other situations may arise where a snapshot may lose value or reference. Thus, example apparatus and methods may selectively update de-duplication storage 320 from non-de-duplication storage 330. The update may occur upon the occurrence of certain events (e.g., snapshot becomes too old, snapshot becomes too big, snapshot becomes too full, non-de-duplication storage 330 becomes too full, VM 302 terminates). In one embodiment, when another non-de-duplication storage is available (e.g., FIG. 5), VM 302 may write a new snapshot to the other non-de-duplication storage before retiring the snapshot in non-de-duplication storage 330.

Figure 4:
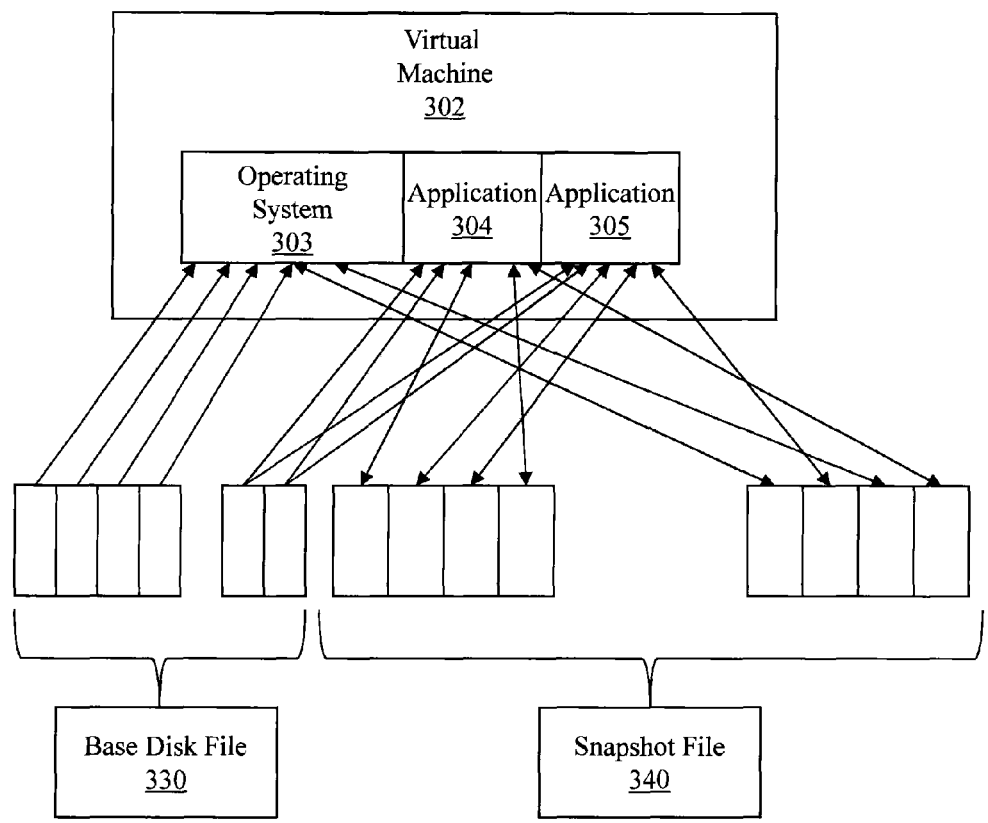
FIG. 4 illustrates an example I/O load associated with an example configuration having a hypervisor, a virtual machine (VM), a primary data store, and a secondary data store.

FIG. 4 illustrates example I/O when VM 302 has access to a de-duplication storage and to a snapshot. VM 302 may run an operating system 303, an application 304, and an application 305. While two applications and one operating system are illustrated, a greater number of applications or operating systems may be employed. When the operating system 303 boots, a large number of reads may be satisfied from base disk file 330, which may be resident in a de-duplication storage apparatus. Similarly, when applications 304 or 305 are instantiated, a large number of reads may be satisfied from base disk file 330. However, as the operating system 303 and the applications 304 and 305 run, the more random I/O load described above may be satisfied from snapshot file 340. Using the dual storage approach with selective control of the device from which I/O is satisfied facilitates using the de-duplication storage for what the de-duplication storage is optimized for and using the snapshot for what the snapshot is optimized for. The dual storage approach facilitates mitigating performance issues associated with either a solely de-duplication based approach or solely snapshot based approach.

FIG. 4 illustrates how when a snapshot file 340 is active, in one embodiment, I/O may be handled so that writes will go to the non-de-duplication device, reads of newly written data will come from the non-de-duplication device, overwrites of newly written data will go to the non-de-duplication device, and reads of boot data and data that is not resident in the snapshot or non-de-duplication device will go to the de-duplication device. Different decisions may be enforced in different embodiments. While boot data is described being read from base disk file 330, VM 302, operating system 303, or applications 304 or 305 may produce some non-boot I/O that is still de-duplication-centric and that will, therefore, be satisfied from base disk file 330. I/O that is "de-duplication-centric" is I/O that involves reading a block or blocks of data in a manner that is more efficient when read from a de-duplication repository than when read from a non-de-duplication repository. For example, a collection of blocks that are stored sequentially and contiguously in a de-duplication repository and that can be read using a single sequential I/O may also be stored non-sequentially or non-contiguously on a non-de-duplication repository from where the blocks would require multiple input/outputs. When all the blocks are desired, the sequential I/O would be de-duplication-centric.

When the snapshot file 340 is to be retired, data that has accumulated in the non-de-duplication device or snapshot file 340 may be written to the de-duplication device. I/O associated with collapsing the snapshot file 340 into the de-duplication device may be well-suited to the de-duplication device. Even though random I/O may have produced the data in the snapshot file 340 to be collapsed, sequential I/O may be employed to write blocks from the non-de-duplication device to the de-duplication device. The sequential I/O may use segments that are large in comparison to file system segment sizes. In one embodiment, the I/O from the non-de-duplication device to the de-duplication device may even be sparse aware, where files that may include a plethora of null data may processed differently from files that contain data with higher entropy and more useful data. To achieve even additional efficiency, intermediate data states accumulated in the non-de-duplication device be collapsed prior to collapsing the snapshot itself.

Figure 5:
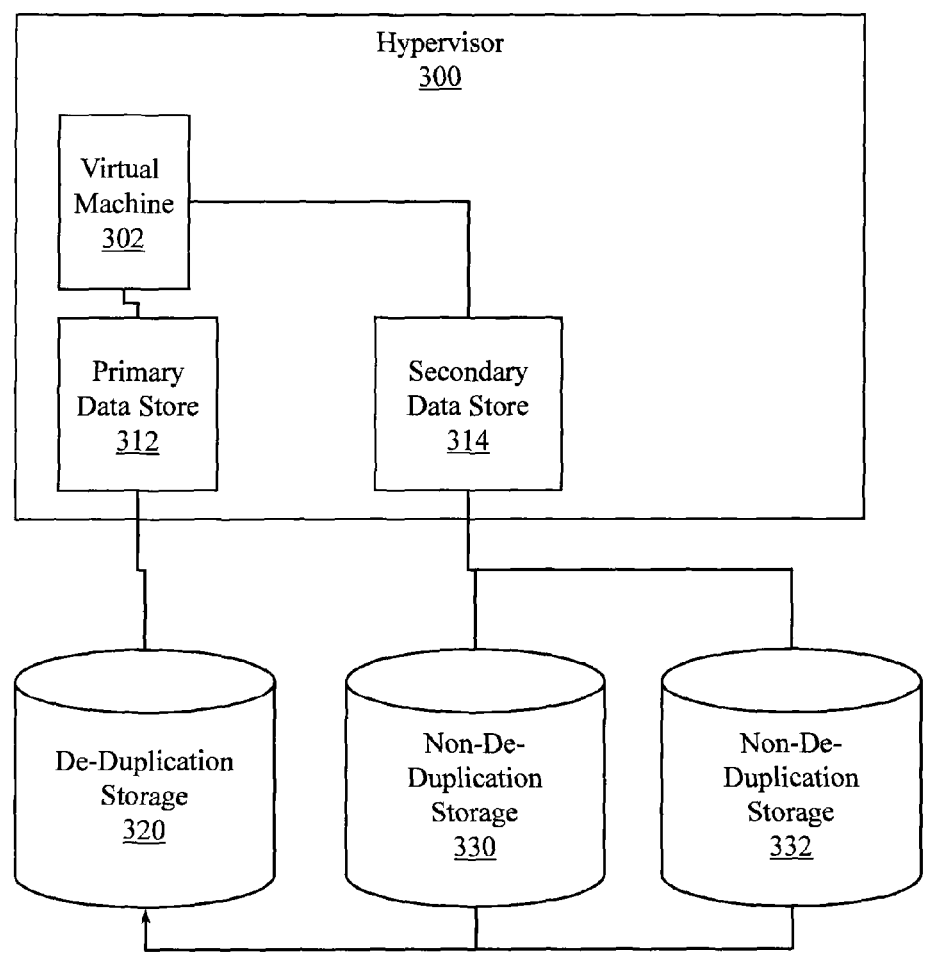
FIG. 5 illustrates an example configuration having a hypervisor, a virtual machine (VM), a primary data store, and a plurality of secondary data stores.

FIG. 5 illustrates a configuration where a hypervisor 300 has access to two non-de-duplication storage devices 330 and 332. In this configuration, hypervisor 300 or VM 302 may cause a new snapshot to be written to a non-de-duplication storage on which the current snapshot is not stored before collapsing the snapshot from the non-de-duplication storage that is currently in use. While two non-de-duplication storages 330 and 332 are illustrated, example configurations may have a greater number of devices available.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 6:
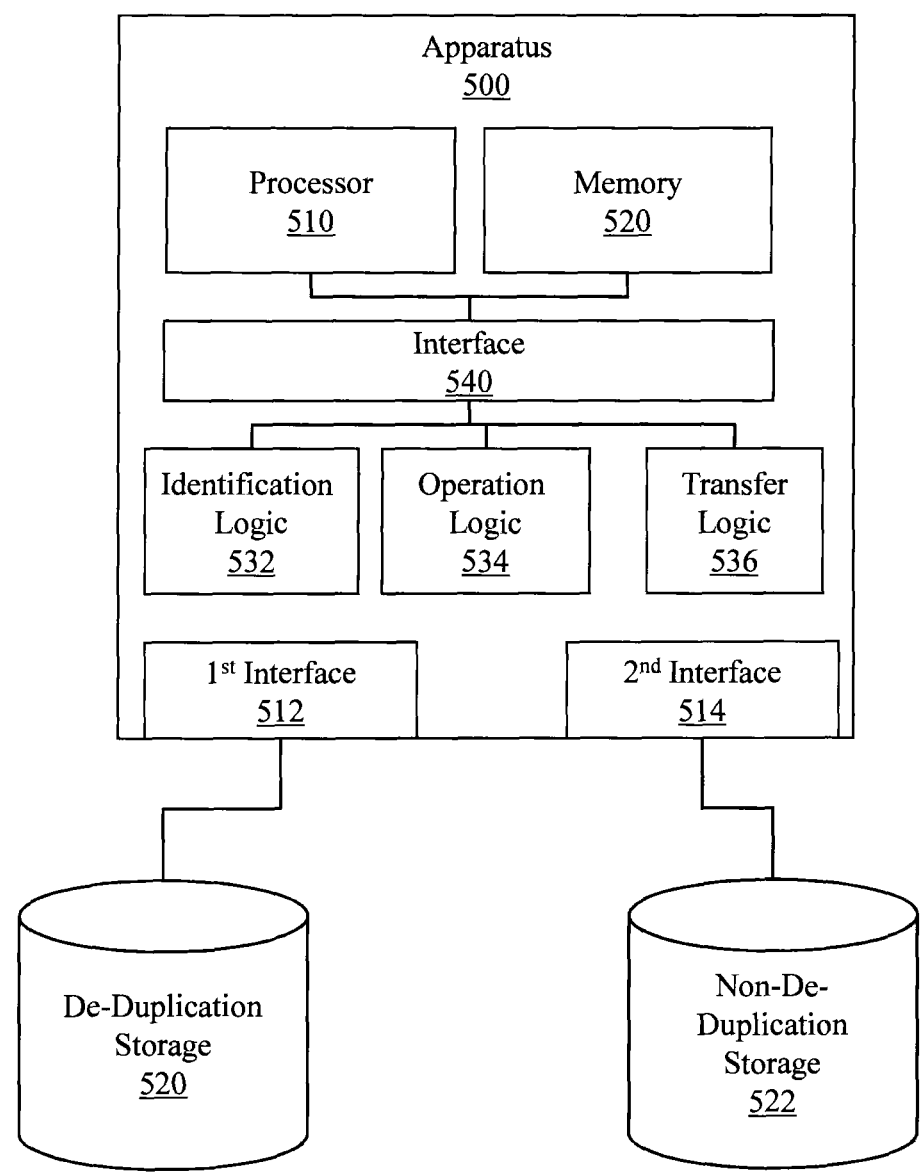
FIG. 6 illustrates an example apparatus associated with supporting VM I/O using multiple storage apparatus, where at least one apparatus is a de-duplication apparatus and where at least one apparatus is a non-de-duplication apparatus.

FIG. 6 illustrates an apparatus 500 that includes a processor 510, a memory 520, and a set of logics that is connected to the processor 510 and memory 520 by an interface 540. The processor 510 may be, for example, a variety of various hardware processors including dual microprocessor and other multi-processor architectures. Memory 520 may include volatile memory and/or non-volatile memory. Non-volatile memory may include, for example, ROM, PROM, and other memory. Volatile memory may include, for example, RAM, SRAM, DRAM, and other memory. The memory 520 can store a process or data.

Processor 510 may be configured to detect an input/output operation associated with a virtual machine running on a hypervisor. The I/O may be, for example, a read or write originating in the VM, a read or write originating in an operating system running in the VM, a read or write originating in an application running on the VM, or other I/O.

Apparatus 500 may include a first interface 512 to a de-duplication storage 520 that stores de-duplicated data associated with the virtual machine. The de-duplication storage 520 may be, for example, a disk drive, a tape drive, an SSD, or other storage device.

Apparatus 500 may also include a second interface 514 to a first non-de-duplication storage 522. The first non-de-duplication storage 522 may store a first snapshot associated with the virtual machine. In one embodiment, the first non-de-duplication storage 522 may store snapshots for multiple VMs. In another embodiment, second interface 514 may provide connectivity to a plurality of non-de-duplication storage devices.

In different embodiments, the de-duplication storage 520 may be part of the apparatus 500 or the first non-de-duplication storage 522 may be part of the apparatus 500. In one embodiment, both the de-duplication storage 520 and the non-de-duplication 522 may be part of the apparatus 500.

Apparatus 500 may include an identification logic 532 that is configured to select a target device from which the input/output operation should be satisfied. The identification logic 532 may select the target device from the de-duplication storage device and the first non-de-duplication storage device. In one embodiment, the target device may be selected as a function of an efficiency condition.

The efficiency condition may concern, for example, identifying the input/output operation as being associated with booting the virtual machine, identifying the input/output operation as being associated with instantiating an operating system on the virtual machine, or identifying the input/output operation as being associated with instantiating an application on the virtual machine. Additionally and/or alternatively, beyond just instantiation and booting, the efficiency condition may concern capacities (e.g., a capacity of the non-de-duplication storage device, a capacity of the first snapshot). For example, if the device or snapshot have adequate capacity, then the I/O may be served from the second device or the snapshot but if the device or snapshot are at or near their capacity, then the I/O may be served from the de-duplication device. The efficiency condition may also concern a predicted time to complete the input/output operation from the de-duplication storage device or a predicted time to complete the input/output operation from the non-de-duplication storage device. In one embodiment, the device whose prediction is shorter may be the selected device. In another embodiment, the efficiency condition may concern how busy the de-duplication storage device is or how busy the non-de-duplication storage device is. For example, the device that is less busy may be selected. The efficiency condition may concern other factors that will determine the efficiency of satisfying the I/O.

In one embodiment, the identification logic 532 may be configured to select the de-duplication storage 520 when the input/output operation is associated with instantiating the virtual machine, instantiating the operating system, or instantiating the application. More generally, identification logic 532 may be configured to select the de-duplication storage 520 when the I/O will be more efficiently served from the de-duplication storage 520. Efficiency may be measured in time, in the amount of operations required to complete the I/O, or in other ways. In another embodiment, the identification logic 532 may be configured to select the non-de-duplication storage 522 when the input/output operation is associated with a non-instantiating operation performed on the virtual machine. More generally, the identification logic 532 may be configured to select the non-de-duplication storage 522 when the input/output operation will be more efficiently served from the non-de-duplication storage 522.

Apparatus 500 may also include an operation logic 534 that is configured to satisfy the input/output operation from the target device. The operation logic 534 may interact with an operating system, a file system, a distributed file system, a distributed operating system, or other hardware or processes to satisfy the I/O operation. Satisfying the I/O may include, for example, initiating a read/write (r/w), scheduling a r/w, causing an operating system to initiate or schedule a r/w, causing a file system to initiate or schedule a r/w, or other action.

Apparatus 500 may also include a transfer logic 536 that is configured to control selectively transferring data from the first non-de-duplication storage 522 to the de-duplication storage 520 upon the occurrence of a transfer event. The transfer event may be, for example, the first snapshot reaching a fullness threshold or the first non-de-duplication storage 522 reaching a fullness threshold. If either the snapshot or the non-de-duplication storage devices are too full, the transfer may be initiated or scheduled. The transfer event may also be, for example, the first non-de-duplication storage 522 reaching an idleness threshold. If the non-de-duplication storage 522 is too busy then the transfer may not be scheduled but if the non-de-duplication storage 522 is idle then the transfer may be initiated or scheduled. The transfer event may also include detecting that a virtual machine, operating system running on the virtual machine, or application running on the virtual machine has terminated. If the snapshot was associated with an entity (e.g., VM, operating system, application) that no longer exists, then the transfer may be initiated or scheduled.

In one embodiment, the transfer logic 536 may be configured to establish a second, different snapshot on a second different non-de-duplication storage device before updating the de-duplication storage 520 from the non-de-duplication storage 522. If the transfer logic 536 writes a new snapshot on a second non-de-duplication storage device, then the transfer logic 536 may also reconfigure the identification logic 532 to select the target device from the de-duplication storage 520 and the second non-de-duplication storage before updating the de-duplication storage 520 from the non-de-duplication storage 522. Once the transfer has been completed, the transfer logic 536 may remove the first snapshot from the first non-de-duplication storage 522.

Figure 7:
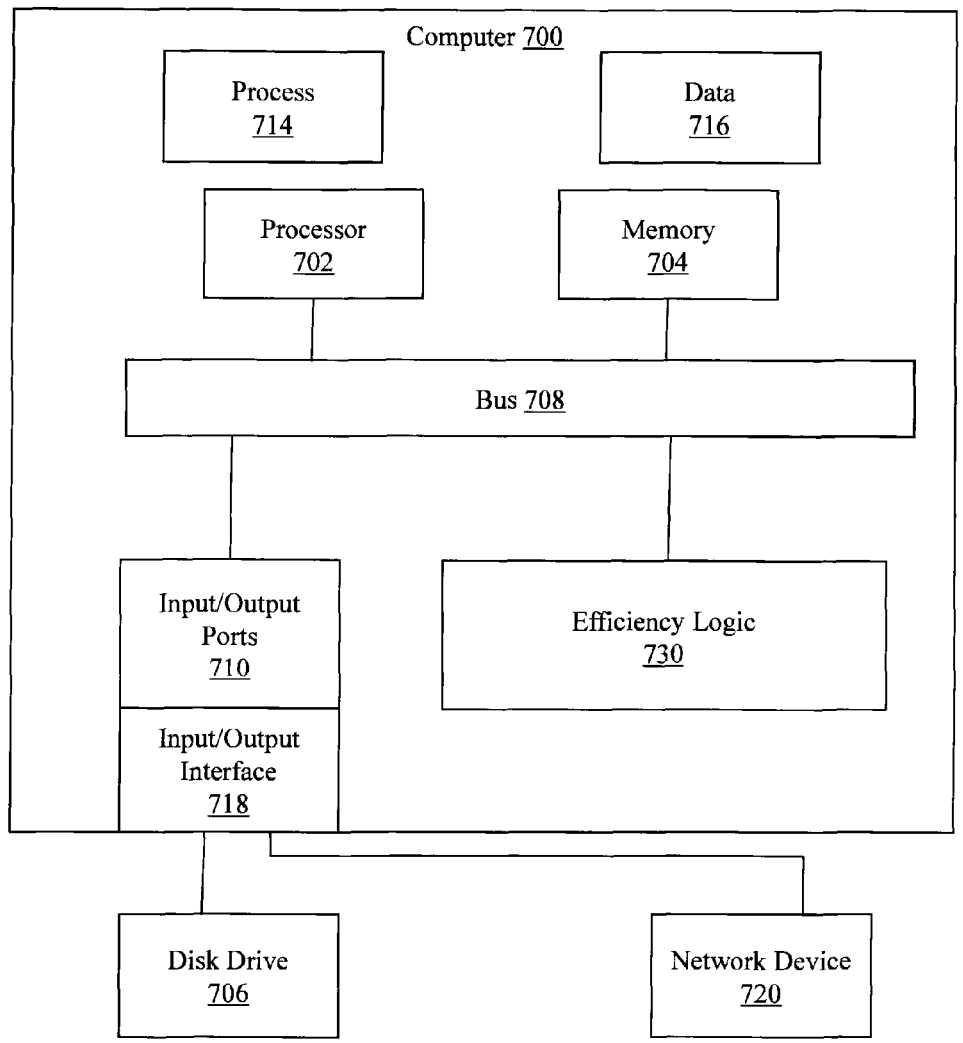
FIG. 7 illustrates an example computer associated with supporting VM I/O using multiple storage apparatus, where at least one apparatus is a de-duplication apparatus and where at least one apparatus is a non-de-duplication apparatus.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include an efficiency logic 730 configured to select between a de-duplication storage and a non-de-duplication storage for satisfying an I/O. The efficiency logic 730 may support virtual machine input/output using both a de-duplication apparatus and a non-de-duplication apparatus. Logic 730 may write and manage a snapshot on the non-de-duplication apparatus. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

In one embodiment, logic 730 may provide means (e.g., hardware, software, firmware) for providing first storage for a virtual machine. The storage may be, for example, disk, tape, SSD, or other physical memory. The first storage will be de-duplication based. The logic 730 may also provide means for providing second storage for the virtual machine. The second storage may be, for example, disk, tape, SSD, or other physical memory. The second storage will not be de-duplication based. The logic 730 may also provide means for acquiring data from the first storage to instantiate the virtual machine. The means for acquiring may be, for example, a circuit, a callback, an operating system function, a file system function, or other process. The logic 730 may also provide means for acquiring data from the first storage to instantiate an operating system on the virtual machine. The means for acquiring may be, for example, a circuit, a callback, an operating system function, a file system function, or other process. The logic 730 may also provide means for acquiring data from the first storage to instantiate an application on the virtual machine from the first storage. The means for acquiring may be, for example, a circuit, a callback, an operating system function, a file system function, or other process. The logic 730 may also provide means for supporting de-duplication-centric input/output from the first storage and means for supporting random input/output for the virtual machine, for the operating system, or for the application from the second storage. The logic 730 may also provide means for selectively updating the first storage from the second storage and means for selectively erasing the second storage upon detecting the termination of the virtual machine.

The means associated with logic 730 may be implemented, for example, as an ASIC. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and other memory. Volatile memory may include, for example, RAM, SRAM, DRAM, and other memory. The memory 704 can store a process 714 and/or a data 716, for example.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, or other device. Furthermore, the disk 706 may be a CD-ROM drive, a CD-R drive, a CD-RW drive, a DVD ROM drive, a Blu-Ray drive, an HD-DVD drive, or other device. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the I/O interfaces 718 and the input/output ports 710. Input/output devices may be, for example, a keyboard, a microphone, a pointing and selection device, cameras, video cards, displays, the disk 706, network devices 720, and other devices. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks. Computer 700 may run a clustered file system that supports multiple computers.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 8:
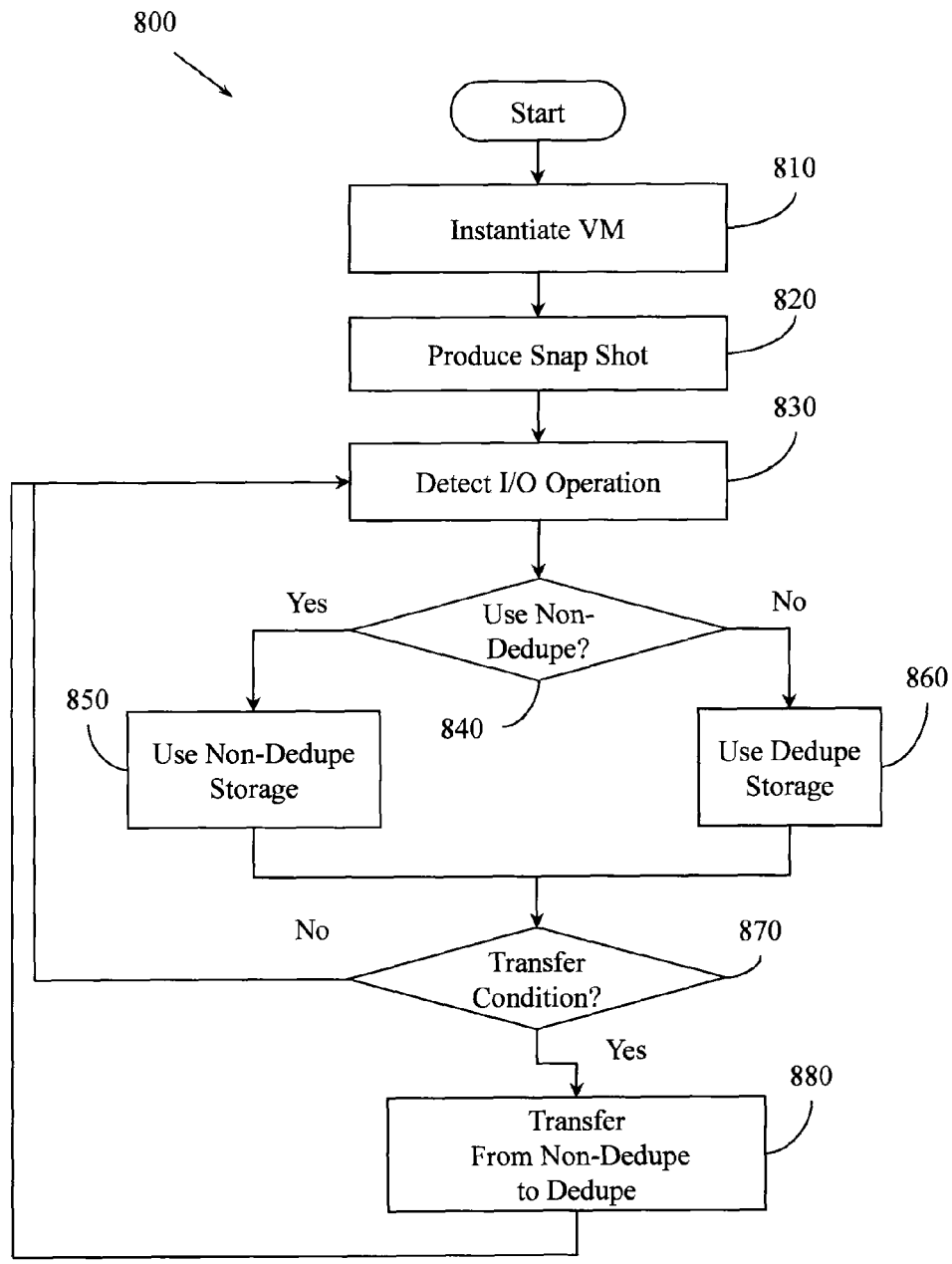
FIG. 8 illustrates an example method associated with supporting VM I/O using multiple storage apparatus, where at least one apparatus is a de-duplication apparatus and where at least one apparatus is a non-de-duplication apparatus.

FIG. 8 illustrates a method 800. Method 800 includes, at 810, instantiating a virtual machine with data read from a first storage apparatus that is configured to store data using data de-duplication. While "instantiating" is described, more generally method 800 may include reading data from a first storage apparatus that is configured to store data using data de-duplication. In one embodiment, instantiating the virtual machine may include reading blocks of de-duplicated data from the first storage apparatus using sequential input/output. Similarly, instantiating an operating system or application to run on the virtual machine may include reading blocks of de-duplicated data from the first storage apparatus using sequential input/output.

Method 800 also includes, at 820, producing a first snapshot of the virtual machine in a second storage apparatus. In one embodiment, producing the first snapshot may include writing at least a portion of virtual memory associated with the virtual machine to the second storage apparatus. Unlike the first storage apparatus that employs data de-duplication, the second storage apparatus stores data without using data de-duplication. Thus, the virtual machine may have access to two different types of storage. Therefore method 800 may include determining which type of storage to access to improve or optimize I/O efficiency.

Method 800 includes, at 830, detecting an I/O operation. At 840, a determination is made concerning whether the I/O can or should be satisfied from the second storage apparatus that does not use de-duplication. If the determination at 840 is that the input/output operation can and/or should be satisfied from the second storage apparatus, then method 800 proceeds, at 850, to satisfy the input/output operation from the second storage apparatus (non-de-duplication apparatus). In one embodiment, detecting the input/output operation that can be satisfied includes identifying a write that will fit in the second storage apparatus, identifying a read for which data is present in the first snapshot or in the second storage apparatus, or identifying a write that will overwrite data already written to the second storage apparatus. In different embodiments, different rules or policies may be established to determine which types of I/O operations should be satisfied from the second storage apparatus. In one embodiment satisfying the input/output operation from the second storage apparatus includes reading data from the first snapshot. Reading data from the first snapshot may include interacting with an operating system, with a file system, with a distributed file system, or with another process. But if the determination at 840 is that the input/output operation can and/or should be satisfied from the first storage apparatus, then method 800 proceeds, at 860, to satisfy the I/O operation from the first storage apparatus (de-duplication apparatus).

Method 800 may also include, at 870, determining whether a transfer condition exists. If the determination at 870 is that a transfer condition does exist, then method 800 proceeds, at 880, to selectively transfer data from the second storage apparatus to the first storage apparatus. In one embodiment, the transfer condition may be based on the storage (e.g., how full the snapshot is, how full the second apparatus is). In another embodiment, the transfer condition may concern the processes that are generating I/O. For example, the transfer condition may concern termination of the virtual machine, termination of an operating system running on the virtual machine, or termination of an application running on the virtual machine. When a process that is accessing the second apparatus or the snapshot terminates, there may be an opportunity to transfer data from the second apparatus or snapshot to the first apparatus.

Since multiple VMs may be running multiple operating systems that may in turn be running multiple applications, in one embodiment, updating the first storage apparatus from the second storage apparatus may include producing a second snapshot before updating the first storage apparatus from the second storage apparatus. Producing the second snapshot may include writing at least a portion of virtual memory associated with the virtual machine to a third storage apparatus that, like the second storage apparatus that it is replacing, is configured to store data without using data de-duplication.

Since the first storage apparatus is a de-duplication apparatus, there may be an opportunity for the second storage apparatus to efficiently transfer data to the first storage apparatus. Thus, in one embodiment, updating the first storage apparatus from the second storage apparatus may include transferring segments of data from the second storage apparatus to the first storage apparatus. Efficiency may be gained by making the segments that are transferred larger than segments associated with a file system associated with the virtual machine. Additional efficiencies may be gained by transferring the segments using sparse-aware sequential input/output.

In one example, a method may be implemented as computer executable instructions. Thus, in one example, a computer-readable medium may store computer executable instructions that if executed by a machine (e.g., processor) cause the machine to perform method 800 or other methods described herein. While executable instructions associated with method 800 are described as being stored on a computer-readable medium, it is to be appreciated that executable instructions associated with other example methods described herein may also be stored on a computer-readable medium.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
    a processor configured to detect an input/output operation associated with a virtual machine running on a hypervisor;
    a first interface to a de-duplication storage device that stores de-duplicated data associated with the virtual machine;
    a second interface to a first non-de-duplication storage device that stores a first snapshot associated with the virtual machine;
    an identification logic configured to select a target device from which the input/output operation should be satisfied, the target device being selected from the de-duplication storage device and the first non-de-duplication storage device, the target device being selected as a function of an efficiency condition; and
    an operation logic configured to satisfy the input/output operation from the target device.

2. The apparatus of claim 1, the input/output operation originating in an operating system running on the virtual machine or in an application running on the virtual machine.

3. The apparatus of claim 2, the identification logic being configured to select the de-duplication storage device when the input/output operation is associated with instantiating the virtual machine, instantiating the operating system, or instantiating the application.

4. The apparatus of claim 1, where the de-duplication storage device is part of the apparatus or the first non-de-duplication storage device is part of the apparatus.

5. The apparatus of claim 1, comprising a transfer logic configured to control selectively transferring data from the first non-de-duplication storage device to the de-duplication storage device upon occurrence of a transfer event.

6. The apparatus of claim 5, the transfer event being the first snapshot reaching a fullness threshold, the first non-de-duplication storage device reaching a fullness threshold, the first non-de-duplication storage device reaching an idleness threshold, detecting termination of the virtual machine, detecting termination of an operating system running on the virtual machine, or detecting termination of an application running on the virtual machine.

7. The apparatus of claim 5, the transfer logic being configured:
to establish a second, different snapshot on a second different non-de-duplication storage device before updating the de-duplication storage device from the first non-de-duplication storage device;
to reconfigure the identification logic to select the target device from the de-duplication storage device and the second non-de-duplication storage device before updating the de-duplication storage device from the first non-de-duplication storage device; and
removing the first snapshot from the first non-de-duplication storage device after updating the de-duplication device from the first non-de-duplication storage device.

8. The apparatus of claim 1, the efficiency condition being identifying the input/output operation as being associated with booting the virtual machine, identifying the input/output operation as being associated with instantiating an operating system on the virtual machine, identifying the input/output operation as being associated with instantiating an application on the virtual machine, a capacity of the first non-de-duplication storage device, a capacity of the first snapshot, a predicted time to complete the input/output operation from the de-duplication storage device, a predicted time to complete the input/output operation from the first non-de-duplication storage device, a measure of how busy the de-duplication storage device is, or a measure of how busy the first non-de-duplication storage device is.

9. The apparatus of claim 1, the efficiency condition being identifying which of the de-duplication storage device and the non-de-duplication storage device can serve the input/output operation more efficiently.

10. The apparatus of claim 1, the identification logic being configured to select the first non-de-duplication storage device when the input/output operation is associated with a non-instantiating operation performed on the virtual machine.

11. A non-transitory computer-readable medium storing computer-executable instructions that when executed by a computer cause the computer to perform a method, the method comprising:
upon detecting an input/output operation associated with a virtual machine running on a hypervisor:
instantiating the virtual machine with data read from a first storage apparatus, the first storage apparatus being configured to store data using data de-duplication;
selecting a second storage apparatus from which a data storage operation using data de-duplication should be satisfied, the second storage apparatus being selected from the first storage apparatus and a non-de-duplication storage device, the second storage apparatus being selected as a function of an efficiency condition;
producing a first snapshot of the virtual machine in the second storage apparatus, the second storage apparatus being configured to store data without using data de-duplication;
upon detecting another input/output operation that can be satisfied from the second storage apparatus, the other input/output operation being associated with the virtual machine, satisfying the other input/output operation from the second storage apparatus;
upon detecting that a transfer condition exists for the second storage apparatus, updating the first storage apparatus from the second storage apparatus, where the transfer condition is a fullness level of the first snapshot, a fullness level of the second storage apparatus, termination of the virtual machine, termination of an operating system running on the virtual machine, termination of an application running on the virtual machine, or an idleness level of the second storage apparatus;
where updating the first storage apparatus from the second storage apparatus includes producing a second snapshot before updating the first storage apparatus from the second storage apparatus, where producing the second snapshot includes writing at least a portion of virtual memory associated with the virtual machine to a third storage apparatus, the third storage apparatus being configured to store data without using data de-duplication; and
where updating the first storage apparatus from the second storage apparatus includes transferring segments of data from the second storage apparatus to the first storage apparatus, where the segments are larger than segments associated with a file system associated with the virtual machine, and where the segments are transferred using sparse-aware sequential input/output.

12. The non-transitory computer-readable medium of claim 11, where instantiating the virtual machine includes reading blocks of de-duplicated data from the first storage apparatus using sequential input/output.

13. The non-transitory computer-readable medium of claim 11, including instantiating an operating system or an application to run on the virtual machine by reading blocks of de-duplicated data from the first storage apparatus using sequential input/output.

14. The non-transitory computer-readable medium of claim 11, where producing the first snapshot includes writing at least a portion of virtual memory associated with the virtual machine to the second storage apparatus.

15. The non-transitory computer-readable medium of claim 11, where detecting the input/output operation that can be satisfied includes identifying a write that will fit in the second storage apparatus, identifying a read for which data is present in the first snapshot or in the second storage apparatus, or identifying a write that will overwrite data already written to the second storage apparatus.

16. The non-transitory computer-readable medium of claim 11, where satisfying the other input/output operation from the second storage apparatus includes reading data from the first snapshot.

* * * * *